United States Patent [19]

Mills et al.

[11] 4,201,690
[45] May 6, 1980

[54] PROCESSING OF IRRADIATED NUCLEAR FUEL

[75] Inventors: Alfred L. Mills, Thurso, Scotland; John A. Williams, Warrington, England

[73] Assignee: United Kingdom Atomic Energy Authority, London, England

[21] Appl. No.: 892,967

[22] Filed: Apr. 3, 1978

[51] Int. Cl.² .................. G21C 19/46; G21F 9/28
[52] U.S. Cl. .................. 252/301.1 W; 55/66; 55/68; 55/71; 60/651; 60/671; 176/37; 423/4; 423/20
[58] Field of Search ............ 252/301.1 W; 423/4, 423/20; 176/37; 422/159; 62/46, 47, 119; 137/13; 60/651, 671; 55/66, 68, 71

[56] References Cited

U.S. PATENT DOCUMENTS

| | | | |
|---|---|---|---|
| 3,195,984 | 7/1965 | Sands | 422/159 |
| 3,469,410 | 9/1969 | Schramm et al. | 176/37 |
| 3,813,464 | 5/1974 | Ayers | 423/20 |
| 4,080,429 | 3/1978 | Koeppe et al. | 252/301.1 W |

FOREIGN PATENT DOCUMENTS

1461182  1/1977  United Kingdom ..................... 60/651

Primary Examiner—Benjamin R. Padgett
Assistant Examiner—Deborah L. Kyle
Attorney, Agent, or Firm—Larson, Taylor and Hinds

[57] ABSTRACT

Irradiated nuclear fuel is dissolved in nitric acid under a carbon dioxide atmosphere which is treated to remove iodine, krypton and xenon and recycled.

3 Claims, 1 Drawing Figure

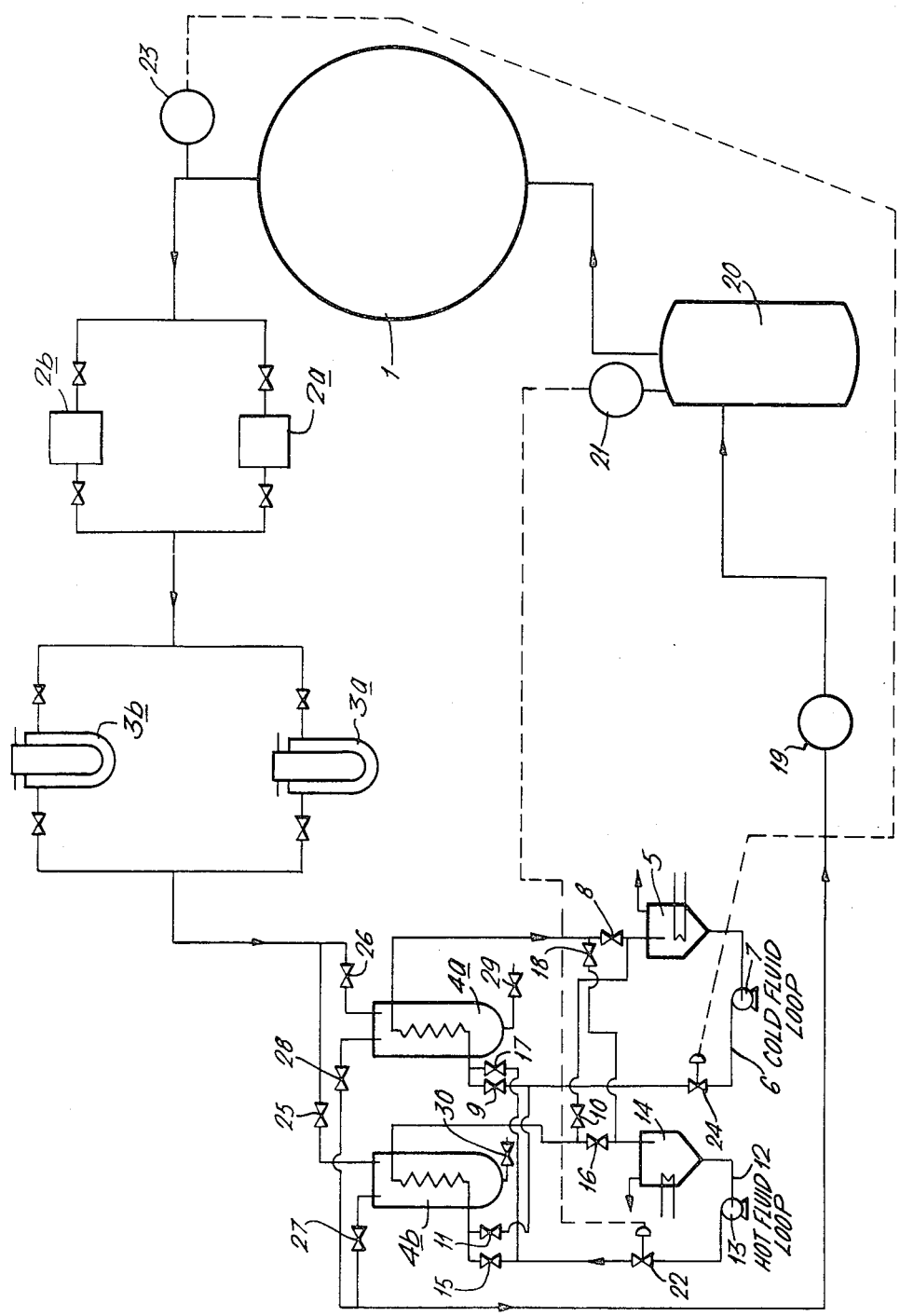

PROCESSING OF IRRADIATED NUCLEAR FUEL

BACKGROUND TO THE INVENTION

This invention relates to the processing of irradiated nuclear fuel and particularly to the dissolution of irradiated nuclear fuel in nitric acid prior to the reprocessing of the fuel.

In one known process for the reprocessing of irradiated nuclear fuel the irradiated nuclear fuel material is first dissolved in nitric acid and the acid solution which contains uranium, plutonium and fission products is contacted with an organic solvent in a solvent extraction process which effects separation of the uranium and plutonium values from the fission products and from each other. During the dissolution of the irradiated fuel material gaseous fission products such as iodine 129, krypton and xenon are released. These gaseous fission products may present a hazard if released into the environment and they are preferably retained in the plant.

SUMMARY OF THE INVENTION

According to the present invention a process for the dissolution of irradiated nuclear fuel in nitric acid is operated under an atmosphere consisting essentially of carbon dioxide.

The carbn dioxide may be circulated inside a plant in which the carbon dioxide is contained by alternatively condensing and evaporating at least a part of the atmosphere in the plant in each of a pair of heat exchangers, one of said pair of heat exchangers being used to condense said part of the atmosphere whilst the other of said pair of heat exchangers is used to evaporate condensed carbon dioxide to provide a continuous driving force to effect circulation of the atmosphere around the plant. The carbon dioxide may be dried to remove moisture and cooled to remove condensible contaminants such as iodine before passing to the heat exchangers which may be purged to remove gases such as krypton and xenon which do not condense during the condensation of the carbon dioxide.

BRIEF DESCRIPTION OF THE DRAWING

The invention will be illustrated by the following description of a plant and process for the treatment of irradiated nuclear fuel. The description is given by way of example only and has reference to the accompanying drawing which is a schematic diagram of a plant for treating irradiated nuclear fuel.

DESCRIPTION OF THE PREFERRED EMBODIMENT

The drawing shows a cave 1 in which is located a dissolver where irradiated nuclear fuel is dissolved in nitric acid. The cave 1 is fitted with carbon dioxide. The carbon dioxide atmosphere is continuously circulated round the plant and on leaving the cave 1 is passed to one of two dryers 2a, 2b which are connected in parallel and are used alternatively to remove water from the carbon dioxide, the water being removed from one dryer whilst the other is in use and has carbon dioxide passing through it. The carbon dioxide then passes to one of two cold traps 3a, 3b which are used alternatively and in which condensible contaminants such as iodine are separated from the carbon dioxide.

The flow of carbon dioxide then passes to one of two heat exchangers 4a, 4b where the carbon dioxide is condensed as a film of solid carbon dioxide. The heat exchanger in which condensation occurs is cooled by a refrigerant which is circulated from a tank 5 round a cold fluid loop 6 by a pump 7. The cold fluid loop 6 contains valves 8, 9, 10, 11. When valves 8 and 9 are opened and valves 10 and 11 are closed the heat exchanger 4a is connected into the cold fluid loop 6 whereas when valves 10 and 11 are open and valves 8 and 9 are closed it is the heat exchanger 4b which is connected into the cold fluid loop. The temperature in the cold fluid loop 6 is conveniently around $-95°$ C. and the refrigerant may be a mixture of methylene chloride and chloroform in the ratio 90:10.

Whilst carbon dioxide is being condensed in one of the heat exchangers carbon dioxide to replace that being condensed is being evaporated from the other heat exchanger by passing a liquid at a temperature above the evaporation temperature of the condensed carbon dioxide through the heat exchanger. The liquid at this temperature is circulated in a hot fluid loop 12 by a pump 13. The liquid which may conveniently be at a temperature of $-65°$ C. is pumped from a tank 14 and the flow to one or other of the heat exchangers 4a, 4b is controlled by valves 15, 16, 17, 18. When valves 15 and 16 are open and valves 17 and 18 are closed the hot fluid 12 is connected to the heat exchanger 4b whereas when the valves 17 and 18 are open and the valves 15 and 16 are closed the heat exchanger 4a is connected to the hot fluid loop 12. A suitable liquid for use in the hot fluid loop 12 is a mixture of methylene chloride and chloroform.

The carbon dioxide evaporated from the heat exchanger passes back to the cave 1 through a heater 19 and a surge vessel 20. A pressure controller 21 communicating with the surge vessel 20 and linked to a valve 22 in the hot fluid loop 12 controls the rate of evaporation and a pressure controller 23 communicating with the cave 1 and linked to a valve 24 in the cold fluid loop 6 controls the rate of condensation.

The heat exchangers 4a, 4b are used alternately as condensors and evaporators, the function of the heat exchanger depending on which of the fluid loops 6, 12 is connected to the heat exchanger. The inflow to the heat exchangers is controlled by valves 25, 26 and the outflow is controlled by valves 27, 28.

As the carbon dioxide is condensed in one of the heat exchangers the gases such as krypton, xenon and any air which has leaked into the plant do not condense and may be removed by purging. The heat exchangers 4a, 4b are provided with outlets 29, 30 respectively to facilitate this purging. After purging the contaminant gases are recovered by known methods. The contaminant gases are at a much greater concentration in the purge gas than they are in the air stream leaving a plant in which ventilation is achieved by passing air through the plant, through decontamination facilities and then releasing the air to the atmosphere. It is therefore easier in a plant constructed in accordance with the present invention to separate the gases krypton and xenon from the atmosphere above a plant in which irradiated nuclear fuel is treated.

The driving force to circulate the carbon dioxide around the plant is provided by the condensation and evaporation of the carbon dioxide in the heat exchangers 4a, 4b. Thus there is no need to have pumps or fans to circulate the carbn dioxide. In plants in which radioactive materials are handled all operations have to be performed remotely to protect the operators from exposure to radioactivity. It is therefore advantageous to have no plant components, such as pumps and fans, which require maintenance.

In a plant in which nuclear fuel is treated it is necessary to filter the atmosphere of the plant to remove particulate radioactive materials. In a plant constructed according to the present invention the condensation of the carbon dioxide or other gas causes deposition of particulate materials in the heat exchangers and thus the need for filtration of the atmosphere is reduced.

We claim:

1. A process for the dissolution of irradiated nuclear fuel in nitric acid comprising the steps of
  (a) contacting the irradiated nuclear fuel material with nitric acid in a dissolver vessel,
  (b) providing an atmosphere of carbon dioxide over the dissolver vessel,
  (c) directing a portion of the atmosphere to the first of a pair of heat exchangers,
  (d) passing a refrigerant through the first of the heat exchangers to cause condensation of said portion of the atmosphere in the first of the heat exchangers,
  (e) simultaneously with step (d) passing a liquid at a temperature above the evaporation temperature of carbon dioxide through the second of the pair of heat exchangers to cause evaporation of a portion of the atmosphere which has been condensed in the second of the pair of heat exchangers,
  (f) after steps (c) (d) and (e) directing a further portion of the atmosphere to the second of the pair of heat exchangers,
  (g) passing a liquid at a temperature above the evaporation temperature of carbon dioxide through the first of the pair of heat exchangers to cause evaporation of the portion of the atmosphere which had condensed therein,
  (h) simultaneously with step (g) passing a refrigerant through the second of the pair of heat exchangers to cause condensation of said further portion of the atmosphere therein,
  (i) repeating steps (c) to (h) to provide a driving force for circulating the atmosphere round the plant by the alternate condensation and evaporation of portions of the atmosphere.

2. A process as claimed in claim 1 including the additional steps of drying the atmosphere circulating in the plant to remove water vapour and cooling the atmosphere to cause removal of iodine before the portions of the atmosphere are directed to the heat exchangers.

3. A process as claimed in claim 1 including the additional step of purging the heat exchangers during the condensation steps to remove gases which do not condense.

* * * * *